2,935,398

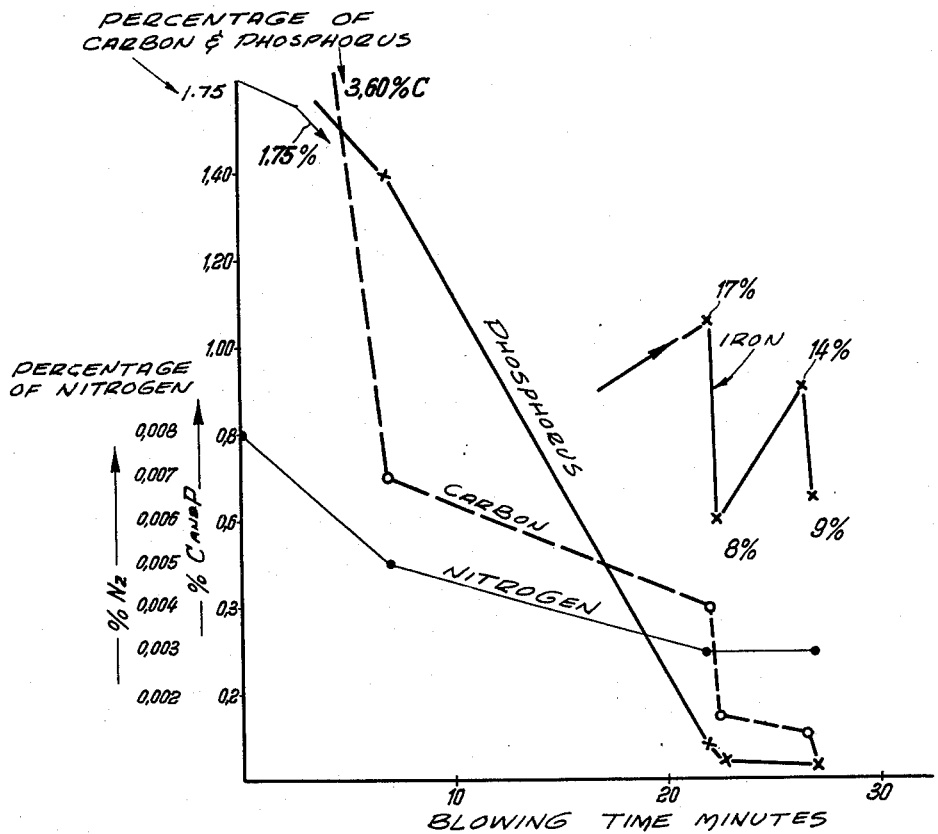

REFINING PIG IRON

Hermann Brandi, Mulheim (Ruhr)-Speldorf, Heinz Hofges, Kapellen, Kreis Moers, and Egon Kohler, Duisburg-Hamborn, Germany, assignors to Phoenix-Rheinsohr Aktiengesellschaft Vereinigte Hutten- und Rohrenwerke, Dusseldorf, Germany Application January 20, 1958, Serial No. 710,042

Claims priority, application Germany March 12, 1957

5 Claims. (Cl. 75—52)

Considerable advance has been made in recent years in the manufacture of Thomas steel having a low content of phosphorus and nitrogen by refining in the basic converter. The first advance was that, at the end of the carbon period and at the beginning of the phosphorus period, a part of the oxygen of the air blast was replaced by combined oxygen, for example, in the form of ore, mill scale or the like, and the charge was blown colder in the phosphorus period. A later change was to blow with air enriched with oxygen, the phosphorus refining at a lower temperature being maintained. Advancing the phosphorus combustion before the carbon combustion, whereby the take up of nitrogen is practically suppressed requires, as is well known, the rapid formation of a thinly liquid slag which is rich in ferrous oxide and working with several changes of slag which disturbs the flexibility of the refining process.

The refining of pig iron with technically pure oxygen which is blown on to or under the surface of the liquid metal has been introduced to an increasing extent for refining pig iron having a low phosphorus content, for example open hearth pig iron, but has not yet been introduced into practice for the treatment of phosphorus-containing pig iron such as Thomas pig iron. In this case also the prerequisite for the formation of a thinly liquid slag containing ferrous oxide for accelerating the phosphorus combustion can only be fitted in with difficulty with the other requirements of the process.

Now the subject of the present invention is a process for refining phosphorus-containing pig iron, for example pig iron containing more than about 0.6% and up to about 2% of phosphorus, which has the advantages both of the basic air refining process and also those of the so-called "top refining process" and results in the production of a steel having very low contents of phosphorus, oxygen and nitrogen.

In accordance with the invention, a pig iron, for example Thomas pig iron of the usual composition, together with the usual addition of lime to which also iron oxide in the form of mill scale or the like may be added, is blown, preferably with air enriched with oxygen, in a bottom blowing basic lined converter at a first stage of the process from below the upright positioned converter until an appreciable part of the carbon is burnt as well as the silicon and manganese. When the charge has a carbon content of for example 0.5 to 0.8% the converter is tilted and in a second stage the charge is refined from the surface with gaseous oxygen, the process being carried out in such a way that a thinly liquid slag with a high content of iron is rapidly formed from the lime which is highly heated and prepared in the previous blast period. This can be reinforced by adding iron ore or mill scale at the beginning of the oxygen blowing period, or by slagging a sufficient quantity of iron for this purpose, blowing as closely as possible onto or into the metal by means of a lance. Then a particularly rapid combustion of the phosphorus to a low value takes place under this slag when further oxygen is supplied, but the carbon combustion is considerably slowed down, so that already at the end of this part of the process a carbon steel having a low content of phosphorus and nitrogen is produced. This steel is further de-carbonized and de-phosphorized in a third stage of the process by a further short blow with the converter in an upright position. By again tilting the converter and blowing with oxygen, the steel can be finished under a fresh lime slag.

The accompanying diagram illustrates the behaviour of the substances accompanying the iron when refining Thomas pig iron in accordance with the invention.

A Thomas pig iron with 3.60% C, 1.75% P and the usual contents of manganese, silicon and sulphur after the usual addition of lime is blown with air enriched with oxygen from below the upright positioned converter to a carbon content of about 0.7% in the basic converter in a first stage which lasts about 7½ minutes. After this the iron contains about 1.4% phosphorus. The converter is then tilted and the charge is refined with oxygen from the surface of the melt, the converter acting as a kind of open hearth furnace. The process is carried out in such a way that, by combustion of the necessary amount of iron, a thinly liquid iron-containing slag is quickly formed. Then, on further blowing with oxygen on the surface of the charge a rapid combustion of the phosphorus takes place under this slag, whereas the carbon content of the charge only slightly decreases relative thereto. At the end of this refining period, which lasts about 15 minutes and constitutes the second stage of the process, the charge still contains about 0.3% carbon, about 0.07% phosphorus, about 0.03% sulphur and about 0.003% nitrogen. The iron content of the final slag is about 17%.

In a third stage in which the converter is set upright for a short time the charge is blown from below for about half a minute. The carbon content of the charge is thereby lowered to about 0.15% and the phosphorus content to about 0.04%, without altering the nitrogen content of about 0.003%.

The converter can then be tilted once more and the charge again blown with oxygen, the slag having previously been changed. After this refining step the charge contains about 0.10% of carbon, about 0.02% of phosphorus, about 0.018% of sulphur and about 0.003% of nitrogen. If the converter is set upright once more for a short time these values are further improved and it is possible to adjust the carbon content almost instantaneously to any practically desirable low value.

The diagram also shows how the molten metal and slag co-operate with one another during the blowing with air and oxygen. At the end of the second stage, i.e. the oxygen stage, there is present, as mentioned above, a slag having a high content of iron, namely about 17% Fe from which, however, in a short after blowing stage, the iron is reduced by the carbon to 8%. In the second top blowing period the iron content increases again to 14% and the slag is tapped with an iron content of about 9% when the converter is set upright for the last time.

The accompanying diagram shows the extraordinary advantages of the process of the invention. They are not only that the process can be carried out with the usual apparatus in an extremely simple manner, but above all, in the control of the phosphorus and carbon combustion, of which the former takes place extremely quickly and the latter proceeds in such a way that a high-grade steel is already produced at the end of the period when the converter has been set upright again for the first time, which steel can then be still further improved as regards its phosphorus content by a subsequent top blow. It is possible with the process of the invention to produce, with certainly, high grade steel having low phosphorus and nitrogen contents and a desired carbon content. By combining the basic air refining process in the first stage in which the lime added is thoroughly prepared for its later liquefaction with a top blowing process in the following stage, a thinly liquid phosphorus slag having a high content of iron is formed so quickly that the refining process results in a very short time in the production of a high grade steel having low phosphorus and nitrogen contents.

Finally it should be particularly mentioned that the de-sulphurization effected by the process of the invention amounts to 70 to 80%.

We claim:

1. A process for refining phosphorus-containing pig iron in a bottom-blowing basic lined converter, comprising blowing from beneath the converter a charge of pig iron containing 0.6 to 2% of phosphorus and the usual amounts of carbon, silicon, manganese and sulphur, with lime added, continuing the blowing while said converter is in upright position until only part of the carbon-content of the charge is eliminated, then tilting the converter to a substantially horizontal position, blowing gaseous oxygen from above onto the charge while the converter is in the horizontal position until the phosphorus content of the charge is reduced to less than 0.1% under a rapidly formed thinly liquid slag which is rich in iron, and then returning the converter to its upright position, and blowing the charge from beneath until the desired carbon content has been reached.

2. A process of refining in a bottom-blowing basic lined converter a charge of pig iron containing 0.6 to 2% of phosphorus and the usual amounts of carbon, silicon, manganese and sulphur with lime added, comprising blowing the charge with air enriched with oxygen from beneath the converter, continuing the blowing while said converter is in upright position until only part of the carbon-content of the charge is eliminated, then tilting the converter to a substantially horizontal position, blowing gaseous oxygen from above onto the charge while the converter is in horizontal position, until the phosphorus-content of the charge is reduced to less than 0.1% under a rapidly formed thinly liquid slag which is rich in iron, and then returning the converter to its upright position and blowing the charge from beneath the converter with air enriched with oxygen, until the desired carbon content has been reached.

3. A process as claimed in claim 1, including the step of adding iron oxide to the charge before initial blowing.

4. A process as claimed in claim 1, comprising continuing the refining of the charge after the final blowing of the charge from beneath by again tilting the converter to substantially horizontal position, changing the slag, blowing gaseous oxygen from above onto the charge until its phosphorus-content is further lowered, returning the converter to its upright position and short blowing the charge from beneath the converter to adjust the carbon content of the charge to still a lower value.

5. A process as claimed in claim 2, comprising continuing the refining of the charge after the final blowing of the charge from beneath by again tilting the converter to a substantially horizontal position, changing the slag, blowing gaseous oxygen from above onto the charge until its phosphorus-content is further lowered, returning the converter to its upright position and short blowing the charge from beneath the converter to adjust the carbon content of the charge to still a lower value of the phosphorus.

References Cited in the file of this patent
UNITED STATES PATENTS 2,793,110     Kosmider et al. _____ May 21, 1957